Feb. 26, 1963 V. POWELL 3,078,961
ROLL-ON TO FREE-WHEEL CONVERTIBLE VEHICLE LIFT
Filed Jan. 31, 1962 6 Sheets-Sheet 1
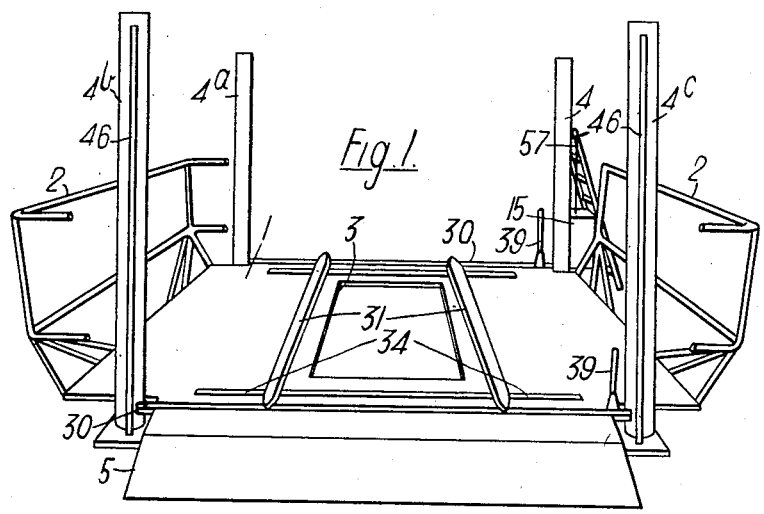
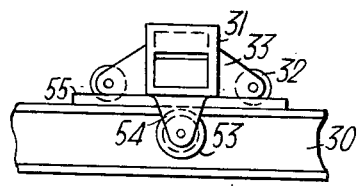
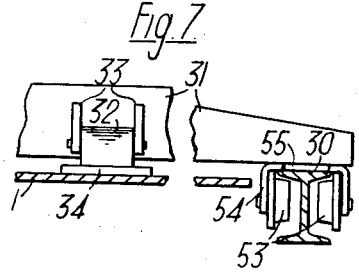
Inventor
VERNON POWELL
By *Juniore and Finley*
Attorneys

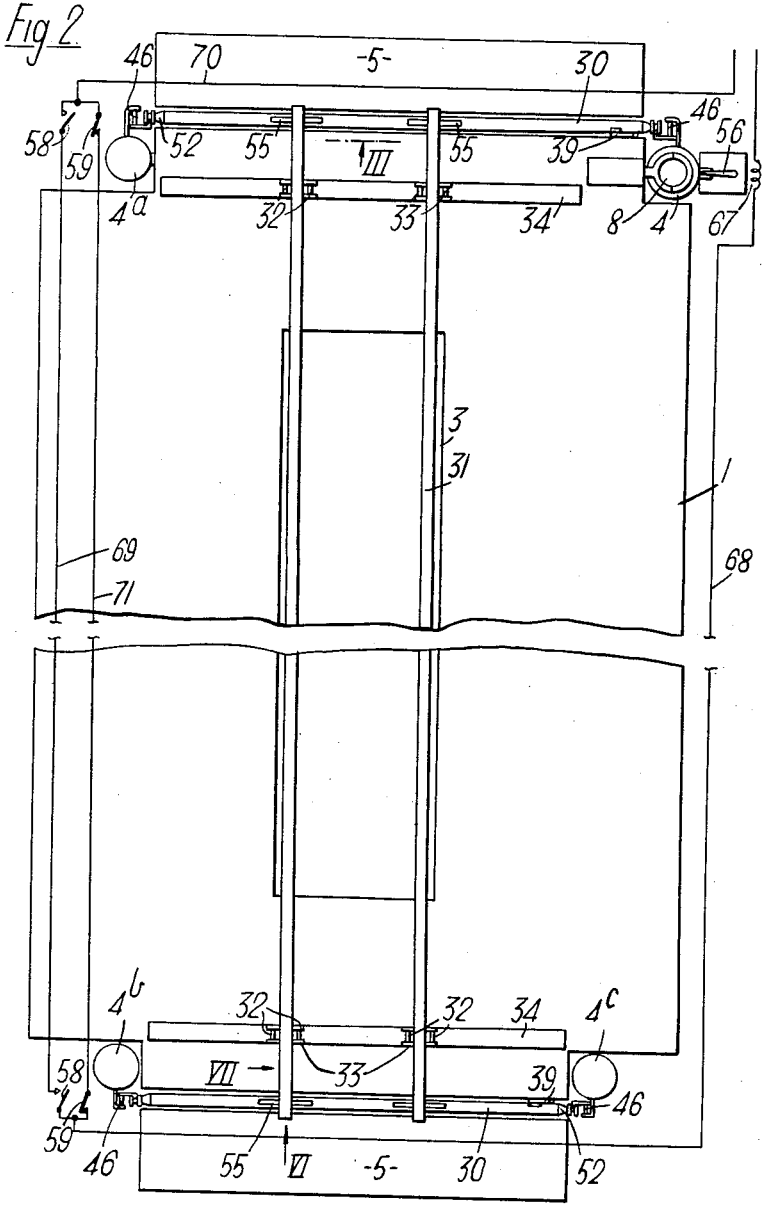

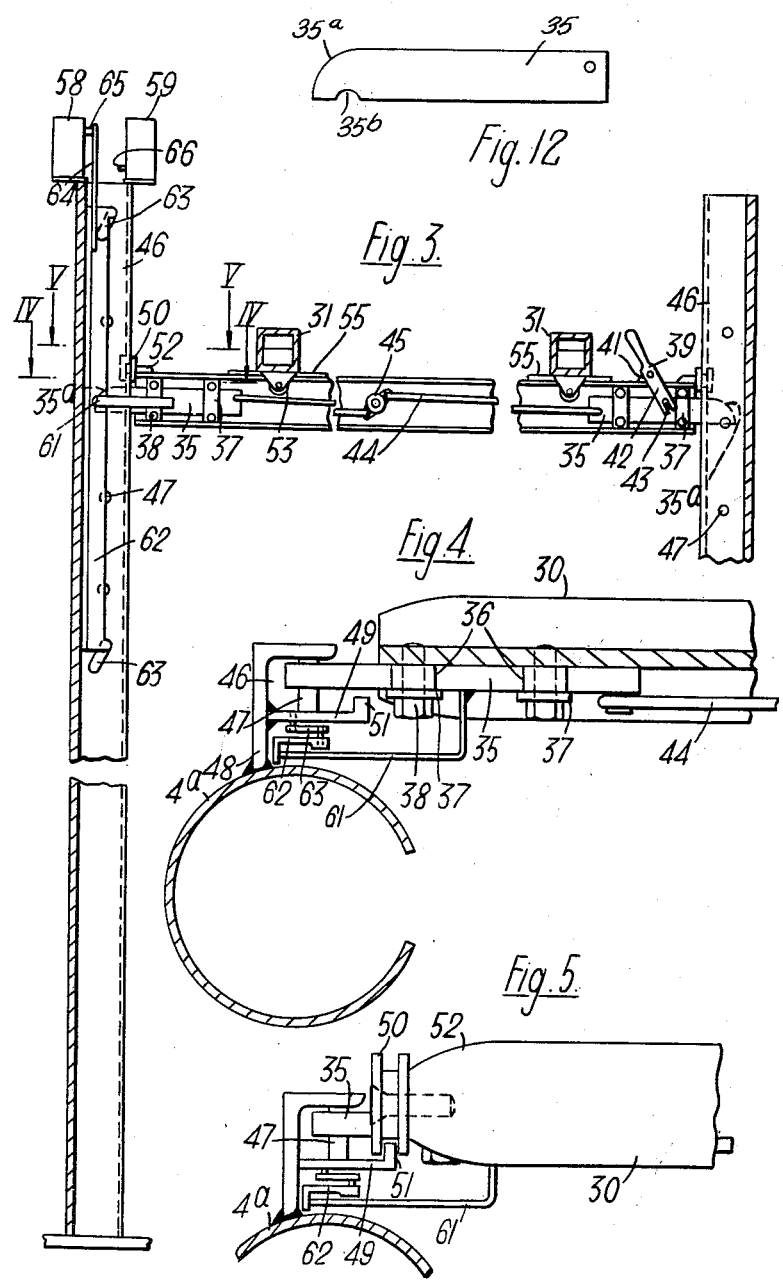

Feb. 26, 1963 V. POWELL 3,078,961
ROLL-ON TO FREE-WHEEL CONVERTIBLE VEHICLE LIFT
Filed Jan. 31, 1962 6 Sheets-Sheet 6

Inventor
VERNON POWELL

By *Imirie and Smiley*
Attorneys

United States Patent Office 3,078,961
Patented Feb. 26, 1963

3,078,961
ROLL-ON TO FREE-WHEEL CONVERTIBLE VEHICLE LIFT
Vernon Powell, Braintree, England, assignor to Joseph Bradbury & Sons Limited, Braintree, Essex, England, a British company
Filed Jan. 31, 1962, Ser. No. 170,114
Claims priority, application Great Britain Sept. 6, 1961
19 Claims. (Cl. 187—8.54)

This invention relates to balcony type vehicle lifts, that is to say, vehicle lifts of the type comprising a platform capable of being raised and lowered which has a central opening to allow easy access to the underside of a vehicle standing on the raised platform, the portions of the platform at the sides, and preferably also at the ends, of the platform providing balconies on which mechanics can work when attending to those parts accessible from the sides, top, front and rear of the vehicle.

When the vehicle is standing on the platform of the known type of balcony lift it is resting on its wheels and no work can be carried out on the wheels or on any other part which requires the removal of the wheels for access, such as brakes, wheel bearings, back axle, and so on. It would promote both convenience and efficiency in working if, with the vehicle in the raised position, it were possible to work on all parts of the vehicle. It would further promote convenient and efficient working if the platform could be adjusted for height with respect to the vehicle while the vehicle is in the raised position. Both these facilities are achieved by the invention.

One object of the invention is to provide a new and useful type of vehicle lift which in its raised position provides access to the under part of the vehicle and to the sides and top of the vehicle, including the wheels.

Another object is to provide a vehicle lift of the balcony platform type having a superposed open structure capable of supporting the vehicle which can be engaged with the lift supports when the platform is in a raised position, so that the platform may be lowered while leaving the vehicle in its raised position with its wheels free. A further object is to provide a vehicle lift of the balcony platform type having a superposed open structure engageable with the lift supports which is adjustable for width so that when the platform is lowered to leave the vehicle supported on the open structure with its wheels free, the vehicle is supported at points properly adapted to support its weight.

A still further object is to provide a vehicle lift having a balcony type platform and an open structure thereon adapted to support a vehicle and to be engaged with the lift supports and retained in the raised position independently of the platform, containing safety devices which prevent the platform from being lowered unless the retaining devices for the open structure are either fully engaged with the lift supports or fully disengaged therefrom.

Other and further objects will appear from a study of the following specification, in conjunction with the accompanying drawings, in which—

FIGURE 1 is a perspective view of the complete lift with the lifting platform and the open structure in fully lowered position;

FIGURE 2 is a plan view of the lift to a larger scale, certain details of the lift having been omitted for the sake of clearness;

FIGURE 3 is an enlarged view of part of the open structure and support means therefor looking in the direction of arrow III, FIGURE 2;

FIGURES 4 and 5 are enlarged plan views of details viewed in the direction of arrows IV—IV and V—V respectively, FIGURE 3;

FIGURE 6 is an enlarged end elevation of a detail viewed in the direction of arrow VI, FIGURE 2;

FIGURE 7 is a side elevation of the detail shown in FIGURE 6, that is, it is an enlarged side elevation of a detail viewed in the direction of arrow VII, FIGURE 2;

FIGURE 12 is a side elevation of a pawl included in means for retaining the open structure in a raised position in relation to the lifting platform of the lift.

Figure 8:
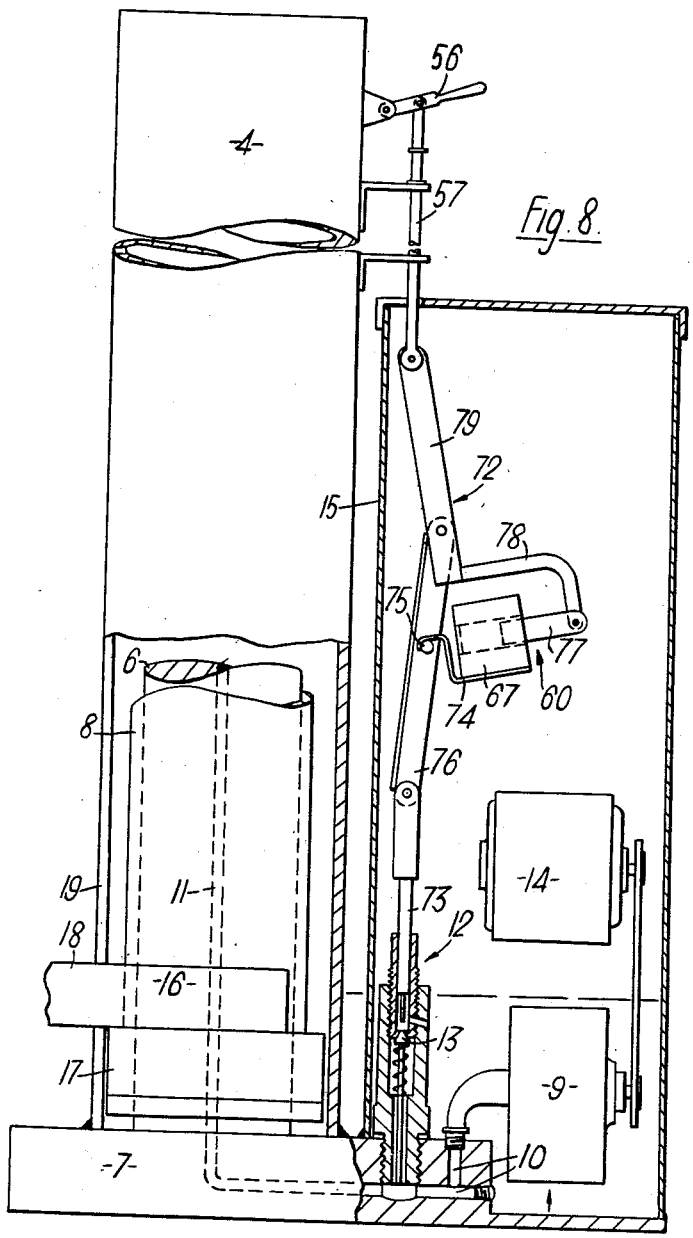
FIGURE 8 is a detail in part section concerned with hydraulic gear comprised in the lifting and lowering means for the platform and open structure referred to previously.

Referring to the drawings, the lift comprises a substantially rectangular platform 1 carrying safety rails 2 and having a centre opening 3, three hollow posts or columns 4a, 4b and 4c at three of the four corners of the platform, a hollow post or column 4 at the remaining corner of the platform, lifting and lowering gear for the platform and fixed ramps 5 at the ends of the platform.

The lifting and lowering gear may be of any suitable kind. In the example shown the said gear comprises a hydraulic ram 6 (see FIGURE 8) upstanding from a base block 7. The ram extends into a cylinder 8 closed at its top. When liquid is forced by a pump 9 into the interior of the upper end of the cylinder, by way of a duct 10 in the base block 7 and a duct 11 in the ram, the cylinder is raised. When a lowering valve 12 is opened by depression of the head 13 of the valve the liquid escapes from the cylinder by way of the ducts 11 and 10 and the valve, the latter being in communication with the duct 10. The lowering valve, pump 9 and a motor 14 for driving the pump are in a box 15; the lower part of the box provides a reservoir for the hydraulic liquid. The ram and cylinder are contained within the column 4.

A fork 16 resting on a flange 17 at the bottom of the cylinder 8 and attached to one corner of the platform connects this corner to the cylinder, the shank 18 of said fork passing through a slot 19 in the column 4.

Figure 9:
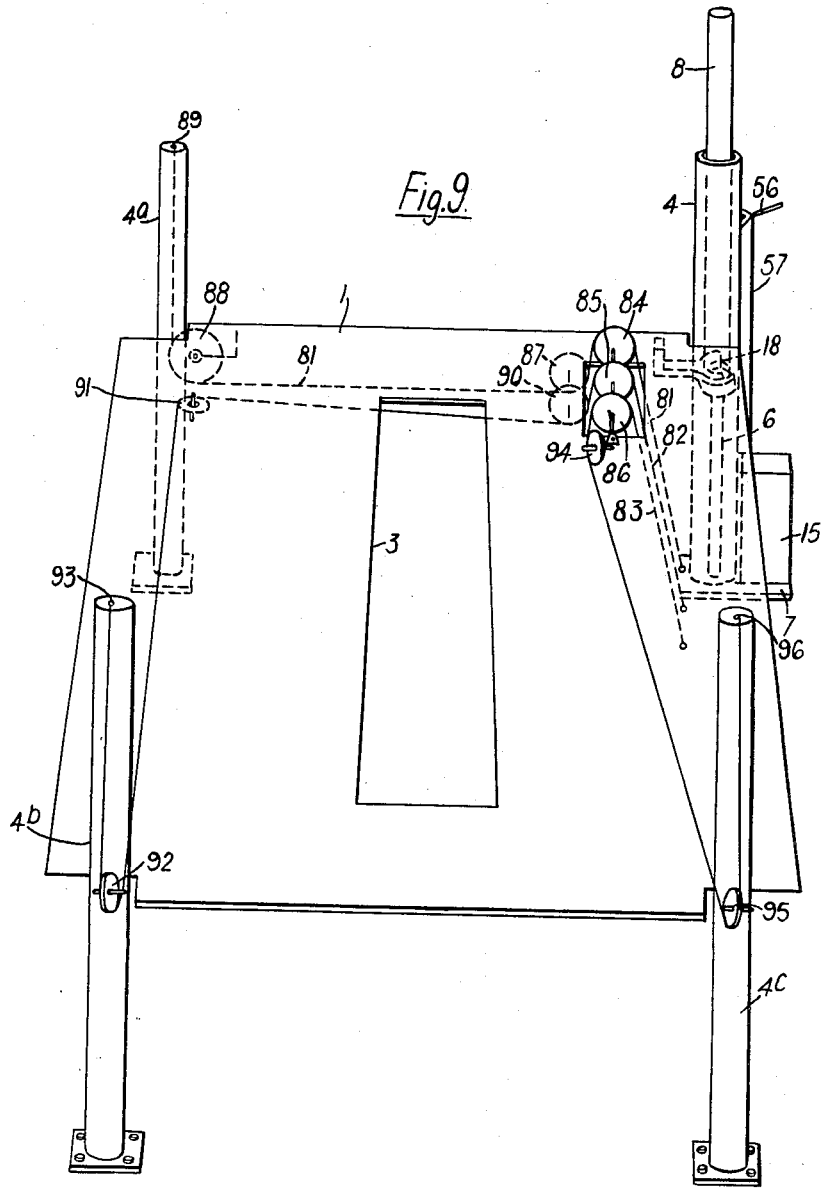
FIGURE 9 is a diagrammatic perspective view of the lift showing the layout of the lifting cables.

FIGURE 9 is a diagrammatic perspective view of the lift showing the layout of the lifting cables. When hydraulic pressure is applied to the cylinder, the cylinder is raised, carrying with it the adjacent corner of the platform. Three cables respectively 81, 82 and 83 are anchored to the base of the column 4, or to the floor adjacent the said base, and pass upwardly over three pulleys, respectively 84, 85 and 86, carried on the platform near the corner adjacent the column 4. The cable 81 passes under two pulleys 87 and 88, mounted beneath the platform and shown in dotted lines, and upwardly inside the column 4a to the top, where it is anchored at 89. The cable 82, after passing over the pulley 85, passes under pulley 90, around pulley 91 and under pulley 92 and then upwardly inside the column 4b to the top, where it is anchored at 93. The cable 83, after passing over the pulley 86, passes under pulleys 94 and 95 and then upwardly inside the column 4c to the top, where it anchored at 96. When the hydraulic cylinder 8 rises and carries the adjacent corner of the platform with it, it also raises the group of pulleys 84, 85 and 86, with the result that the cables 81, 82 and 83 are pulled and act to raise the remaining three corners of the lift platform, so that the platform is lifted at its four corners and is maintained in a horizontal plane.

In accordance with the invention the lift is provided with means comprising an open structure for supporting a vehicle, raised by the lift, in "wheel-free" position. This structure in the example shown comprises a rectangular frame formed by two transverse members 30 (FIGURES 1 and 2) and two longitudinal members 31 laterally displaceable along the transverse members. The longitudinal members have rollers 32 at their sides near their ends borne by brackets 33 at the sides of the said members; the platform has transverse rails 34 beneath the rollers. When the said structure and platform are in the positions shown in FIGURES 1 and 2 the rollers 32 rest on the rails 34. The rollers facilitate lateral movement of the longitudinal members in relation to the platform and convey rising movements of the platform to the said members.

Pawls 35 (as shown in FIGURES 3, 4, 5 and 12) are mounted on the transverse members at the ends of the latter, the pawls being slidable outwardly and inwardly of the said ends; the mounting for each pawl comprises spacing collars 36 at the top and bottom edges of the pawls, retaining plates 37 at that side of each pawl furthest from the web of the transverse member (the transverse members being I-section bars) and securing bolts 38 passing through the plates 37 near the tops and bottoms of the latter, through the collars 36 and engaging holes in the webs. Sliding movements of the pawls are effected by forked hand levers 39 attached to the transverse members at the right-hand ends thereof (FIGURES 2 and 4) by pivots 40 borne by brackets 41 on the top flanges of the transverse members. The forked or lower ends 42 of each lever receives a pin 43 projecting from the adjacent pawl so that when the lever is turned on its pivot the pawl moves outwards or inwards in relation to the transverse member on which it is mounted. The pawls at the ends of the respective transverse members are interconnected by push-pull rods 44 and a cross-over link 45 pivoted at its centre to the web of the transverse member, the ends of the rods 44 being pivotally attached to the respective pawls and to the links. Hence, when the hand levers are operated to move the right-hand pawls outwards the left-hand pawls follow suit and when the right-hand pawls are moved inwards by the levers the left-hand pawls move inwards.

Four vertical racks 46 are mounted on the four columns opposite to the respective pawls; these racks comprise rungs 47 so positioned that they can be selectively engaged by the pawls opposite to them when the pawls are extended and the previously raised open structure is lowered sufficiently to permit of this.

Conveniently and as shown each rack comprises a vertical angle iron 48 extending substantially from the top to the bottom of a column, a rigid metal strip 49 opposite to and spaced from one flange of the angle iron, and the rungs 47 straddling the gap between the said flange and strip. The said strip is welded at one edge to the other flange of the angle iron and this flange is welded to the column so that the gap containing the rungs has an open side opposite to the pawls 35.

The transverse members terminate near the racks; each end of the transverse members has a guide roller 50 engaging a bead 51 on the strip 49, said rollers being borne by stubs in brackets 52 secured to the transverse members.

The longitudinal members are attached to the transverse members by flanged rollers 53 at the undersides of the longitudinal members engaging the undersides of the top flanges of the transverse members as shown in FIGURES 6 and 7, said rollers being on pivots carried by lugs 54 depending from the middle parts of metal bars 55. The said bars are secured at the said parts to the undersides of the respective longitudinal members and extend laterally thereof so as to provide feet which inhibit any tendency of the longitudinal members to rock on the transverse members.

When the lift is in ready for use condition the platform 1 lies at the base of the lift and the open structure rests on the rails 34.

A vehicle to be dealt with is run on to the platform 1 in the usual way, the longitudinal members of the open structure having been previously laterally adjusted if necessary so as to underlie selected parts of the vehicle (other than the wheels) able safely to bear the weight of the vehicle.

The platform 1 and with it the open structure and the vehicle are raised to a height a little greater than that finally required, the pawls 35 are extended into the racks and then lowering of the platform is commenced. The open structure descends for a short distance with the platform until arrested by the rungs 47 lying immediately beneath the extended pawls, and the vehicle descends with the platform until arrested by the longitudinal members of the open structure; descent of the platform is allowed to continue until it clears the vehicle wheels, whereupon further descent is stopped. The vehicle is thus supported by the open structure in "wheel-free" condition. Men standing on the ground may freely work on the underside of the vehicle, others standing on the balcony or platform may freely work on the freed wheels, brakes, engine and other parts of the vehicle readily accessible from this position.

The pawls are preferably undercut on their lower faces as shown at 35b FIGURE 12 so that once the pawls rest on the rungs whilst the open structure supports a vehicle, retraction of the pawls cannot be effected.

When it is desired to remove the vehicle the platform 1 is raised until it, by contact with the vehicle wheels, raises the vehicle and eventually entrains the open structure sufficiently to lift the pawls 35 clear of the rungs with which they were in engagement. Then the pawls are retracted by operation of the hand levers 39 and the whole is lowered to the bottom of the lift by operating a lowering lever 56 and a push rod 57 mounted on the column 4 to open the lowering valve 12. Entrainment of the open structure is effected through the rails 34, the rollers 32 and their brackets; the transverse members 30 rise with the longitudinal members owing to the engagement of the rollers 53 with the upper flanges of the transverse members.

It will be observed that the upper ends 3 of the pawls 35 are rounded at 35a, so that if the platform is raised too far with the pawls in the extended position then, when the next higher rung 47 is reached, the pawls are pushed back into their retracted positions.

In order to prevent the open structure from being lowered unless the pawls are either fully extended or are fully retracted the pawls are interlocked with the lowering control gear of the lift. For this purpose the two pawls which enter the racks on the columns 4a and 4b are arranged to render the lift lowering control gear ineffective unless the said two pawls (and therefore the two pawls which are positively coupled to them by the rods 44 and the links 45) are in one or other of the said conditions. The said two pawls which enter the racks on columns 4a and 4b are arranged when fully extended to close self-opening switches 58 at the tops of the said racks and when fully retracted to close self-opening switches 59 at the tops of the racks; and the switches 58 when closed or the switches 59 when closed bring about the energization of a solenoid 60 which only when energized enables the push rod 57 to open the lowering valve 12 upon depression of the lever 56.

A device for bringing about closure of the switch 58 at the top of the rack on column 4a is shown in FIGURES 3, 4 and 5. It comprises an abutment 61 on the pawl which enters this rack, a vertical bar 62 of L-section borne by parallel links 63 at the top and bottom of one of its flanges and a blade spring 64 at the top of the bar. Elements 62, 63 and 64 are located in a gap between the strip 49 and the column in such a position that the other flange of the bar 62 lies opposite to the abutment 61; one end of each link 63 is pivoted to the bar and the other end of each link is pivoted to the strip 49. Thus the bar is able to swing laterally and vertically. When the said pawl is fully extended the abutment 61 by engagement with the flange of bar 62 opposite thereto thrusts the bar away from the platform to the position shown and as a result the blade spring 64 depresses the button 65 of switch 58 to close this switch, the button being at one end of the swing of the bar. When the pawl is fully retracted the bar is free to swing (by gravity) on the links 63 until the blade spring 64 depresses the button 66 of switch 59 to close the switch, button 66 being at the other end of the swing of the bar.

Elements similar to 62, 63 and 64 are mounted in a similar position on the strip 49 of the rack on column 4b and the pawl adjacent to this rack has an abutment corresponding to 61. The abutment on this pawl brings about closure of switch 58 or switch 59 on the top of the rack in the way described with reference to FIGURES 3, 4 and 5.

Switches 58 are in series with the coil 67 of the solenoid by way of lines 68, 69 and 70; switches 59 are in series with the said coil by way of lines 68, 71 and 69. The switches are preferably micro switches.

The function of the solenoid is to give rigidity to or to upset a collapsible tappet in the form of a toggle 72 (FIGURE 8) which determines whether or not the toggle can act as a tappet conveying the downthrust of the push rod 57 to a second tappet 73 adapted to depress the valve head 13 to open the valve 12. For this purpose the coil 67 is borne by an angled spring arm 74 fixed at 75 to the lower link 76 of the toggle, and the core 77 of the solenoid is pivotally attached at its outer end to a rigid angled arm 78 fixed to the lower end of the upper link 79 of the toggle. The top and bottom of the toggle are pivotally connected to the bottom and the top of the push rod 57 and the tappet 73 respectively.

When the switches 58 are closed, or when switches 59 are closed according to the position of the pawls, the toggle is energized and is then and only then able to take part in opening the valve 12.

If desired all pawls may be positively interconnected mechanically so that only one switch 58 and one switch 59 need be provided for imparting the above described safety feature to the lift.

Figure 10:
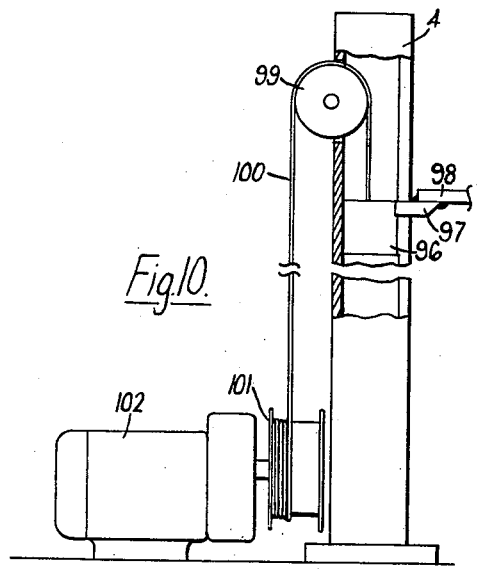
FIGURE 10 is a diagrammatic view showing how the lift may be arranged for operation entirely by cables instead of by hydraulic gear.

FIGURE 10 shows diagrammatically how the lift previously described may be arranged for operation entirely by cables in place of the hydraulic piston and cylinder incorporated in lift column 4 in the earlier figures.

In FIGURE 10 the lift column 4 is shown partly cut away to illustrate a guide member 96 carried inside the column and having an integral arm 97 projecting through the slot in the column. This arm is attached by welding to the platform, a part of which is indicated at 98, so that it is rigidly attached thereto. A pulley 99 is fixed near the top on a bracket so that the pulley projects into the column. A cable 100 anchored to the guide member 96 passes upwardly around the pulley 99 and down to a cable drum 101 attached to the output shaft of a geared motor 102 which provides a suitable low rotational speed at its output shaft.

Figure 11:
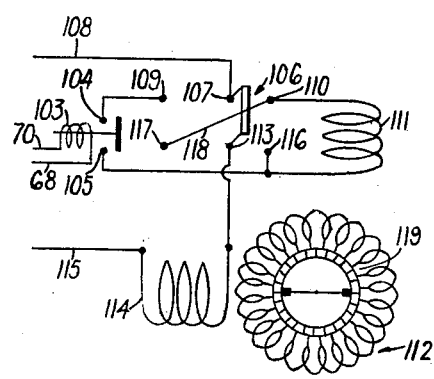
FIGURE 11 is a wiring diagram showing the motor control circuit for the arrangement of FIGURE 10, with a safety switch incorporated.

FIGURE 11 shows a circuit for the control gear of a reversible two-phase motor incorporating the electrical equivalent of the safety device previously described, which prevents the platform from being lowered unless the retaining means, i.e. the pawls 35, are either all fully engaged with the racks on the columns or fully disengaged. The winding 103 of a contactor or relay switch is connected to the leads 68 and 70 and when energized causes two contact points 104 and 105 to be bridged.

A double pole changeover switch indicated generally by 106 has one central contact 107 connected to one of the mains supply leads 108. One outer contact 109, associated with the central contact 107, is connected to the contact 104 and the other outer contact 110, associated with the central contact 107, is connected to one field coil 111 of the two-phase motor, generally indicated by 112. The other central contact 113 of the switch 106 is connected to one end of the second field winding 114 of the motor and the other end of the winding 114 is connected by a lead 115 to the other pole of the supply mains. The outer contact 116 of the switch 106, associated with the central contact 113 is connected to the other end of the field winding 111 and the remaining outer contact 117 of the switch 106 is cross-connected to contact 110 by a lead 118.

If the switch 106 is placed in the right-hand position in FIGURE 11 current flowing from the mains lead 108 to the central contact 107 passes through one switch arm to the contact 110, thence through the stator winding 111 to contact 116, through the other switch arm to contact 113, and through the second stator winding 114 to the second mains lead 115. On the other hand, if the switch is placed in the left-hand position in FIGURE 11 the current flows from the lead 108 to the contact 107, across the one switch arm to the contact 109 and to the contact 104. It can only proceed further if the winding 103 is energized and, as previously explained, this can only occur if the pawls 35 are either all fully engaged or all fully disengaged. Assuming that the winding 103 is energized and contacts 104 and 105 are bridged, the current flows from contact 104 to contact 105, then through stator winding 111 to the contact 110, through the cross connection 118 to the contact 117, through the other switch arm to the contact 113, through the second stator winding 114 and thence to the other pole of the mains via the lead 115. It is arranged that with the switch 106 in the right-hand position, first described, the rotor 119 of the motor 112 runs in the direction to raise the platform. When the switch is in the left-hand position it will be observed, by tracing the circuit, that the current flows in the opposite direction through the stator winding 111 so that the motor runs in the opposite direction, i.e. in the direction appropriate to lower the platform and it can only run in this direction if the winding 103 is energized.

I claim:

1. A vehicle lift of balcony type comprising support means, a platform to accommodate a vehicle, means to raise and lower said platform on said support means, an open structure borne by said platform adapted to support said vehicle at points other than its wheels, and means on said structure engageable with said support means to retain said structure in a raised position, whereby said platform may be lowered to leave said vehicle in its raised position with its wheels free.

2. A lift as claimed in claim 1 wherein said retaining means includes extensible and retractable pawls mounted on said structure, and comprising fixed upright racks included in said support means engaged by said pawls when in their extended condition.

3. A lift as claimed in claim 2 wherein said platform is rectangular and said support means comprise columns adjacent the corners of said platform, said columns containing said means to raise and lower said platform, said pawls being carried by said structure, and comprising racks carried by said columns engaged by said pawls when in their extended condition.

4. A lift as claimed in claim 2 wherein said pawls are mechanically interconnected in pairs so that both pawls of any pair assume their fully extended or fully retracted condition together.

5. A lift as claimed in claim 2 wherein all said pawls are mechanically interconnected, whereby all said pawls assume their fully extended or fully retracted condition together.

6. A lift as claimed in claim 1 wherein said structure comprises two transverse members, and two longitudinal members to support said vehicle, said longitudinal members bearing at or near their ends on said transverse members so as to be supported by said transverse members, said longitudinal members being laterally displaceable on said transverse members to enable their spacing to be adjusted to suit the structure of the vehicle on said platform.

7. A lift as claimed in claim 6 wherein said transverse members are in the form of webbed girders, and said longitudinal members are attached to said transverse members by rollers borne by said longitudinal members engaging the undersides of webs in said transverse members.

8. A lift as claimed in claim 6 wherein said platform is provided with transverse rails and said longitudinal members are provided with rollers bearing on said rails to facilitate the lateral adjustment of said longitudinal members.

9. A vehicle lift of balcony type comprising support means, a rectangular platform to accommodate a vehicle, means to raise and lower said platform on said support means, an open structure borne by said platform adapted to support said vehicle at points other than its wheels, means on said structure engageable with said support means to retain said structure in a raised position, whereby said platform may be lowered to leave said vehicle in its raised position with its wheels free, and interlock means acting between said retaining means and said means to raise and lower said platform, said interlock means being effective to prevent lowering of said platform unless said retaining means are in a first condition in which they are fully engaged with said support means, or in a second condition in which they are fully disengaged from said support means.

10. A lift as claimed in claim 9 wherein said interlock means comprises an electric circuit and means responsive to the closure of said circuit for rendering said means to raise and lower said platform effective for lowering said platform, and means effective to close said circuit when said retaining means are in their first and their second condition.

11. A lift as claimed in claim 9 wherein said retaining means comprises an extensible and retractable pawl at each corner of said platform, said pawls being linked together in pairs, and switch means in said circuit associated with one pawl of each pair to bring about the closure of said circuit when both pairs are extended.

12. A lift as claimed in claim 9 wherein said retaining means comprises an extensible and retractable pawl at each corner of said platform, all said pawls being mechanically linked together so that they are all in their extended or retracted positions together, and switch means in said circuit which are closed when said pawls are in their fully extended condition.

13. A lift as claimed in claim 9 comprising an extensible and retractable pawl at each corner of said structure, rack means on each of said columns engaged by an adjacent pawl when in its extended position, a vertical bar mounted on one of said columns to swing laterally, the adjacent pawl causing said bar to swing to one position when fully extended and to another position when fully retracted, a switch closed by said bar when in its one position and a second switch closed by said bar when in its other position, said switches being connected in parallel with each other and in series with said circuit.

14. A vehicle lift of balcony type comprising four supporting columns, a platform to accommodate a vehicle, hydraulic means including a cylinder to raise and lower said platform on said columns, an open structure borne by said platform adapted to support said vehicle at points other than its wheels, means on said structure engageable with said columns to retain said structure in a raised position, whereby said platform may be lowered to leave said vehicle in its raised position with its wheels free, a release valve for allowing hydraulic fluid to escape from said cylinder to lower said platform, and interlock means operative between said retaining means and said release valve effective to prevent the opening of said release valve unless said retaining means is in a first or a second condition, said retaining means in its first condition being fully engaged to support said structure in its raised position and said retaining means in their second position being fully disengaged from said support means.

15. A lift as claimed in claim 14 comprising a collapsible tappet for operating said release valve, an electromagnet for making said tappet rigid when energized, switch means operated by said retaining means when in their fully extended condition or in their fully retracted condition, and circuit means by which said electromagnet is energized by the operation of said switch means.

16. A lift as claimed in claim 15 wherein said retaining means comprises an extensible and retractable pawl at each corner of said structure, rack means on each of said columns engaged by the adjacent pawl when extended, and means to operate said switch means when said pawls are all in their fully extended condition and when said pawls are all in their fully retracted condition.

17. A vehicle lift of balcony type comprising support means, a platform to accommodate a vehicle, means to raise and lower said platform on said support means including cables attached to said platform and cable winding means driven by a reversible electric motor, a control circuit for said motor, an open structure borne by said platform adapted to support said vehicle at points other than its wheels, means on said structure engageable with said support means to retain said structure in a raised position, whereby said platform may be lowered to leave said vehicle in its raised position with its wheels free, interlock means acting between said retaining means and said control circuit effective to prevent said motor from running in the direction to lower said platform, said interlock means being ineffective when said retaining means are fully engaged with said support means and also being ineffective when said retaining means are fully disengaged from said support means.

18. A lift as claimed in claim 17 wherein said interlock means comprises an electromagnetic contactor in said control circuit, and switch means, said switch means being closed when said retaining means is in its fully engaged condition and in its fully disengaged condition, said switch means when closed being effective to close said contactor.

19. A lift as claimed in claim 18 comprising a plurality of pawls on said structure, a plurality of racks on said support means engaged by said pawls when in their extended condition, and means acted upon by said pawls in their fully extended condition and in their fully retracted condition to close said switch means.

References Cited in the file of this patent

UNITED STATES PATENTS

| | | |
|---|---|---|
| 824,269 | Wilson | June 26, 1906 |
| 1,521,990 | Beynon | Jan. 6, 1925 |
| 1,545,426 | Hoffman | July 7, 1925 |
| 1,555,637 | Davis | Sept. 29, 1925 |
| 2,139,597 | Martin | Dec. 6, 1938 |
| 2,420,903 | Nobel | May 20, 1947 |
| 2,695,076 | Yordi | Nov. 23, 1954 |
| 2,843,223 | Villars | July 15, 1958 |
| 2,930,449 | Nupp et al. | Mar. 29, 1960 |